US011549355B2

(12) United States Patent
Song et al.

(10) Patent No.: US 11,549,355 B2
(45) Date of Patent: Jan. 10, 2023

(54) AVOIDING GEOLOGICAL FORMATION BOUNDARIES DURING DRILLING OPERATIONS

(71) Applicant: HALLIBURTON ENERGY SERVICES, Houston, TX (US)

(72) Inventors: Xiaobin Song, Beijing (CN); Bronwyn Michelle Djefel, Spring, TX (US); Michael Joseph Davila, Houston, TX (US); Zhiqin Wu, Edmonton (CA)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/338,525

(22) PCT Filed: Oct. 19, 2016

(86) PCT No.: PCT/US2016/057699
§ 371 (c)(1),
(2) Date: Apr. 1, 2019

(87) PCT Pub. No.: WO2018/075027
PCT Pub. Date: Apr. 26, 2018

(65) Prior Publication Data
US 2020/0040718 A1    Feb. 6, 2020

(51) Int. Cl.
*E21B 44/00*  (2006.01)
*E21B 49/00*  (2006.01)
(Continued)

(52) U.S. Cl.
CPC .............. *E21B 44/00* (2013.01); *E21B 49/00* (2013.01); *G01V 3/02* (2013.01); *G01V 3/38* (2013.01); *G05B 15/02* (2013.01)

(58) Field of Classification Search
CPC ........ E21B 44/00; E21B 49/00; G01V 99/005
See application file for complete search history.

(56) References Cited

U.S. PATENT DOCUMENTS 6,594,584 B1 *   7/2003   Omeragic ................ G01V 3/28
                                                    702/9
7,958,949 B2     6/2011   Al Hadhrami
(Continued)

FOREIGN PATENT DOCUMENTS

WO    2016057103 A1    2/2016
WO    2018075027 A1    4/2018

OTHER PUBLICATIONS

International Search Report and Written Opinion; PCT Application No. PCT/US2016/057699; dated Jul. 7, 2017.
(Continued)

*Primary Examiner* — Rocio Del Mar Perez-Velez
*Assistant Examiner* — Vi N Tran
(74) *Attorney, Agent, or Firm* — Novak Druce Carroll LLP (57) ABSTRACT

Systems and methods for generating a curtain plot that includes two inverted parameters based on the formation boundaries and the formation resistivity, the uncertainties of the formation boundaries, and the uncertainties of the drilled well-path, generating an updated curtain plot that includes two projected inverted parameters based on updated formation boundaries and updated formation resistivity, the projected uncertainties of the updated formation boundaries, and the projected uncertainties of the planned well-path, and avoiding, by the drilling operations, the uncertainties of the formation boundaries of the curtain plot and the updated curtain plot based on the two inverted parameters and the two projected inverted parameters to maintain or adjust the planned well-path within the projected uncertainties of the planned well-path.

20 Claims, 4 Drawing Sheets

(51) Int. Cl.
*G05B 15/02* (2006.01)
*G01V 3/02* (2006.01)
*G01V 3/38* (2006.01)

(56) References Cited

U.S. PATENT DOCUMENTS

| | | | |
|---|---|---|---|
| 9,103,936 B2 | 8/2015 | Calleja et al. | |
| 2005/0171698 A1 | 8/2005 | Sung et al. | |
| 2007/0168133 A1* | 7/2007 | Bennett | G01V 3/38 702/6 |
| 2008/0288226 A1* | 11/2008 | Gurpinar | G01V 11/00 703/10 |
| 2009/0198447 A1* | 8/2009 | Legendre | G01V 1/50 702/11 |
| 2009/0299636 A1* | 12/2009 | Carnegie | E21B 47/00 702/6 |
| 2010/0057365 A1* | 3/2010 | Merchant | G01V 3/28 702/7 |
| 2011/0050232 A1* | 3/2011 | Wilt | G01V 3/30 324/334 |
| 2012/0186873 A1* | 7/2012 | Shayegi | E21B 21/08 175/25 |
| 2013/0038463 A1* | 2/2013 | Heliot | G01V 3/18 340/853.1 |
| 2013/0144531 A1* | 6/2013 | Johnston | E21B 44/00 702/9 |
| 2014/0000964 A1* | 1/2014 | Selman | E21B 44/00 175/24 |
| 2015/0292266 A1* | 10/2015 | Johnson | E21B 7/04 175/24 |
| 2017/0328191 A1* | 11/2017 | Wessling | E21B 44/00 |
| 2017/0328192 A1* | 11/2017 | Wessling | E21B 47/06 |
| 2018/0306942 A1* | 10/2018 | Tang | G01V 3/18 |
| 2020/0040718 A1 | 2/2020 | Song et al. | |

OTHER PUBLICATIONS

"Geosteering Techniques in Thin Coal Reservoirs", Frontiers + Innovation; Christine Burinda et al., 2009 CSPG CSEG CWLS Convention.

"Deep Electrical Images, Geosignal and Real Time Inversion Help Guide Steering Decisions", SPE 123940, Douglas J. Seifert et al., 2009, Society of Petroleum Engineers.

"Real-time Proactive Optimal Well Placement Using Geosignal and Deep Images", OTC 20894, Michael Bittar et al., 2010, Offshore Technology Conference.

"Taking the First Steps: Stimulating the Nappamerri Trough Resource Play", SPE 160307, M.C. Pitkin and T.H. Wadham, Beach Energy et al., 2012, Society of Petroleum Engineers.

"The Characterization of Fracture Mechanisms Using a Combination of Surface Microseismic Imaging, Microdeformation Modelling, and Downhole Microseismic Mapping: An Examination of the Value of Moment Tensor Microseismic Imaging", URTeC: 1920493, Raquel Velasco et al., 2014, Unconventional Resources Technology Conference.

"ADR™ sensor geosteers and places the wellbore entirely in the "sweet spot" with better reservoir properties.", H011681, Halliburton, 2015.

Office Action; Brazilian Application No. BR112019006417-6; dated Aug. 4, 2020.

Examination Report for Australian application No. 2016427000, dated Sep. 17, 2021, 3 pages.

* cited by examiner

AVOIDING GEOLOGICAL FORMATION BOUNDARIES DURING DRILLING OPERATIONS

CROSS-REFERENCE TO RELATED APPLICATIONS

This application is a national stage entry of PCT/US2016/057699 filed Oct. 19, 2016, said application is expressly incorporated herein in its entirety.

FIELD OF THE DISCLOSURE

The present disclosure generally relates to systems and methods for avoiding geological formation boundaries during drilling operations. More particularly, the present disclosure relates to avoiding geological formation boundaries during drilling operations by identifying and intuitively displaying the uncertainty of geological formation boundaries relative to an entire well-path.

BACKGROUND

Geosteering solutions are very important for optimizing well placement while drilling, especially for landing the reservoir or drilling through the reservoir. Conventional geosteering is usually based on a geological model constructed from seismic imaging and offset well logs. Vertical offset wells are commonly drilled to provide stratigraphic information from mud and well-logging, such as acoustic, resistivity, nuclear magnetic resonance, and fluid sampling tools. This type of geophysical data may be acquired during logging while drilling (LWD) operations, or after with wireline tools.

Current, real-time geosteering techniques can image formation properties by inverting resistivity data for layered earth one-dimension (1D) resistivity models. One such technique uses distance to bed boundary (DTBB) inversion from deep LWD resistivity measurements to produce a "curtain plot," which is a simple visualization of stitched layered earth 1D resistivity models that can be interpreted for geological structure and geosteering decisions. Curtain plots may contain uncertainties, however. Such uncertainties may include, for example: i) a lack of two-dimensional (2D) and 3D model complexity at each measured depth because the earth model is assumed to be locally in only 1D; and ii) non-unique resistivity inversion, implying multiple earth models may satisfy the same resistivity data. A curtain plot captures a possible solution, and reconciling differences between the curtain plot and the geological model (especially in the absence of other LWD data) is a common challenge in geosteering.

Figure 1:
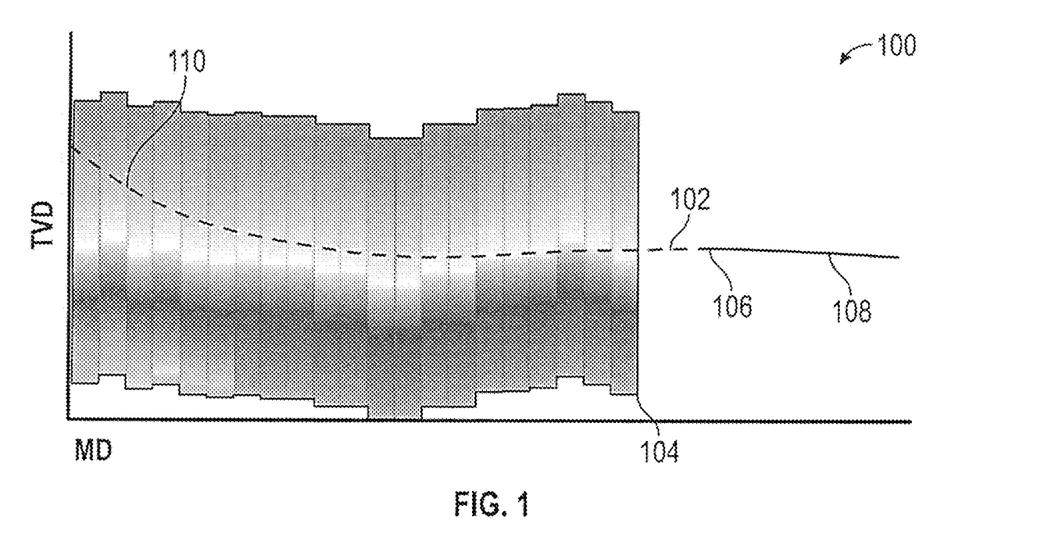
FIG. 1 is a conventional curtain plot illustrating two inverted parameters (formation boundaries and formation resistivity) using variable density log data.
Figure 2:
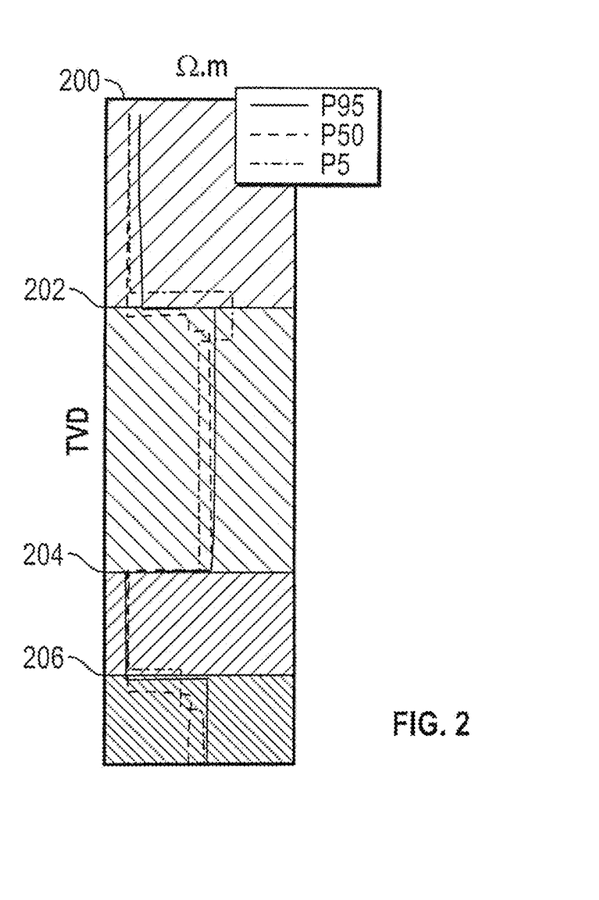
FIG. 2 is a multi-line graph illustrating TVD and inverted formation resistivity (am) at a given MD in the curtain plot of FIG. 1.

In FIG. 1, a conventional curtain plot 100 illustrates two inverted parameters (formation boundaries and formation resistivity) using variable density log data. A formation boundary may represent a surface, a fault or any other geological formation boundary. The curtain plot 100 is shown with measured depth (MD) along the x-axis and true vertical depth (TVD) along the y-axis. The gray-scale represents the inverted formation resistivity of the formation geology surrounding a drilled well-path 102 (dashed line). The gray-scale ends just before the drilled well-path 102, which represents the position of a sensor 104 that acquires the variable density log data. The end of the drilled well-path 102 represents the position of a drill-bit 106 and the beginning of a planned well-path 108. The manner in which uncertainty in both of these parameters (formation boundaries and formation resistivity) is currently displayed is through an adjacent multi-line graph at a given MD. In FIG. 2, the multi-line graph 200 illustrates TVD along the y-axis and inverted formation resistivity ($\Omega \cdot m$) along the x-axis at a given MD 110 in the curtain plot 100. Various results (P5, P50, P95) are also plotted, which represent different probabilities (i.e. levels of uncertainty) with respect to matching an actual formation boundary and matching actual formation resistivity. The multi-line graph 200 illustrates four different formation types (cross-hatched) separated by three separate formation boundaries 202, 204, 206. The vertical portion of each result (P5, P50, P95) represents the probability of matching actual formation resistivity and the horizontal portion of each result represents the probability of matching an actual formation boundary. Thus, the horizontal portion of the P95 result lies substantially along each formation boundary 202, 204, 206. Because the multi-line graph 200 is plotted for a specific MD, the uncertainty across the entire curtain plot 100 (i.e. well-path) cannot be seen.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

The present disclosure overcomes one or more deficiencies in the prior art by identifying and intuitively displaying the uncertainty of geological formation boundaries relative to an entire well-path in order to avoid geological formation boundaries during drilling operations.

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be described with respect to the oil and gas industry, it is not limited thereto and may also be applied in other industries (e.g. drilling water wells) to achieve similar results.

Method Description

Figure 3:
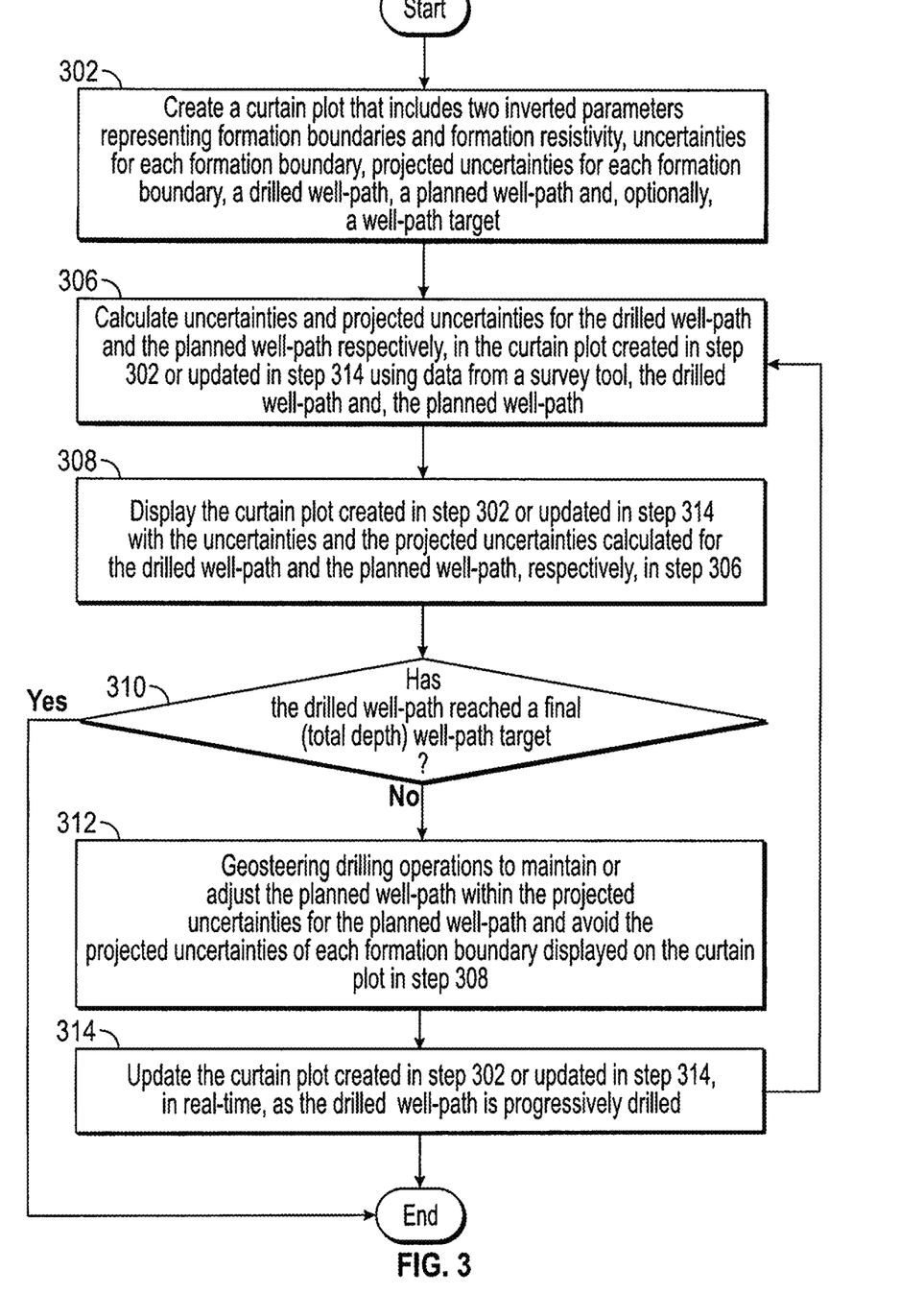
FIG. 3 is a flow diagram illustrating one embodiment of a method for implementing the present disclosure.

Referring now to FIG. 3, a flow diagram illustrates one embodiment of a method 100 for implementing the present disclosure.

In step 302, a curtain plot is created that includes two inverted parameters representing formation boundaries and formation resistivity, uncertainties for each formation boundary, projected uncertainties for each formation boundary, a drilled well-path, a planned well-path and, optionally, a well-path target. The inverted parameter representing formation resistivity is from variable density log data acquired from logging tools in a high-angle, horizontal active well however, may include any other type of data projected from a vertical offset well or a resistivity inversion of a traditional layered earth model. Preferably three uncertainties and projected uncertainties are included for each formation boundary, which represent different probabilities (e.g. P5, P50, P95) with respect to matching each respective actual formation boundary, however, fewer or more may be included.

In step 306, uncertainties and projected uncertainties are calculated for the drilled well-path and the planned well-path, respectively, in the curtain plot created in step 302 or updated in step 314 using data from a survey tool, the drilled well-path, the planned well-path and techniques well-known in the art. Preferably two uncertainties and projected uncertainties are calculated for the drilled well-path and the planned well-path, respectively, which represent different boundaries between which the drilled well-path and the planned well-path may lie. Steps 302-306 may be performed in parallel.

Figure 5:
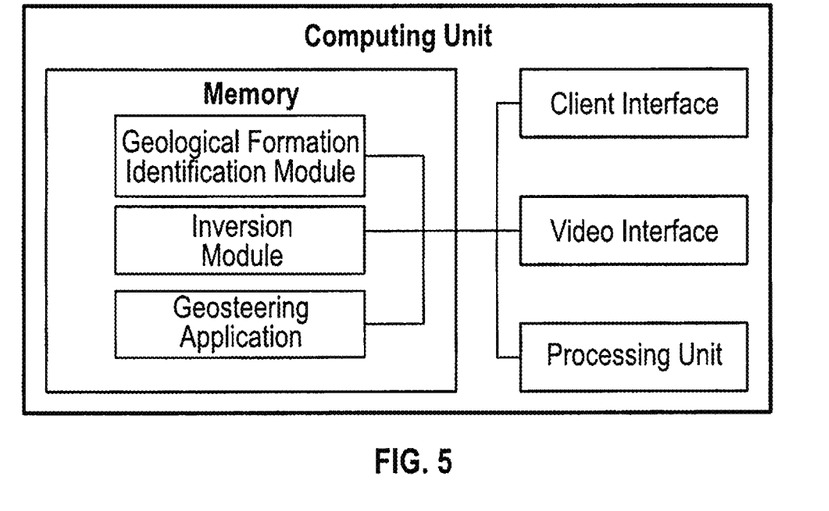
FIG. 5 is a block diagram illustrating one embodiment of a computer system for implementing the present disclosure.

In step 308, the curtain plot created in step 302 or updated in step 314 is displayed with the uncertainties and the projected uncertainties calculated for the drilled well-path and the planned well-path, respectively, in step 306 using the client interface and/or the video interface described further in reference to FIG. 5.

In step 310, the method 100 determines if the drilled well-path has reached a final (total depth) well-path target. If the drilled well-path has reached the final well-path target, then the method 100 ends. Otherwise, the method 100 proceeds to step 312.

In step 312, the drilling operations are geosteered to maintain or adjust the planned well-path within the projected uncertainties for the planned well-path and avoid the projected uncertainties of each formation boundary displayed on the curtain plot in step 308.

In step 314, the curtain plot (i.e. two inverted parameters, uncertainties for each formation boundary, projected uncertainties for each formation boundary, drilled well-path, planned well-path and, optionally, well-path target) created in step 302 or updated in this step 314 is updated, in real-time, as the drilled well-path is progressively drilled and the method 100 returns to step 306. In this manner, the two inverted parameters, the uncertainties for each formation boundary, the projected uncertainties for each formation boundary, the drilled well-path, the planned well-path and, optionally, the well-path target are updated.

Figure 4:
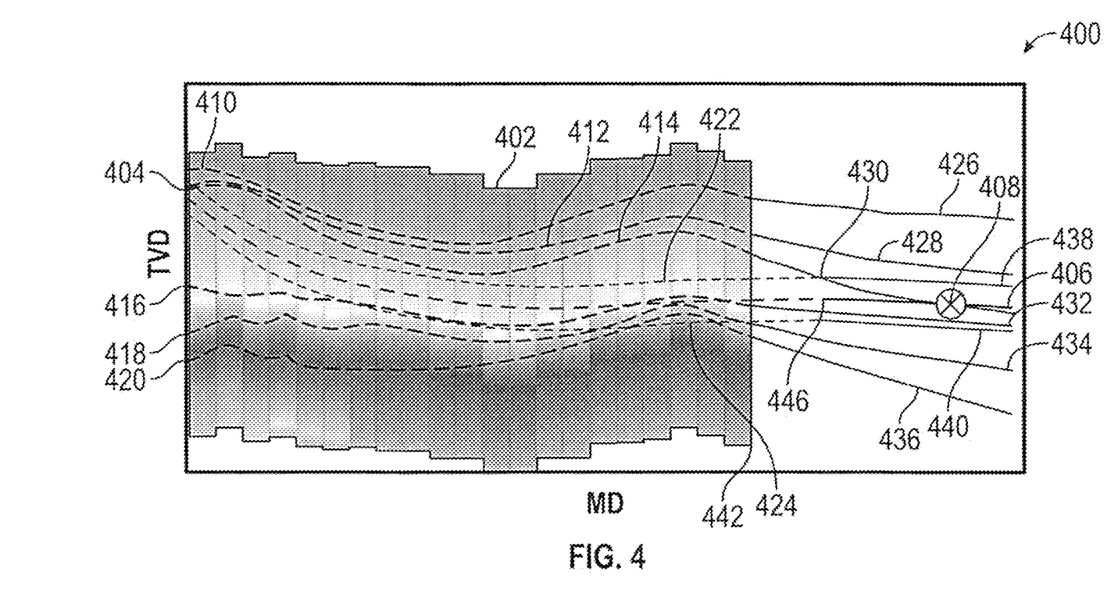
FIG. 4 is a curtain plot illustrating steps 302-308 in FIG. 3.

Referring now to FIG. 4, a curtain plot 400 illustrates two inverted parameters 402 representing formation boundaries and formation resistivity, a drilled well-path 404, a planned well-path 406 and a well-path target 408 created according to step 302 in FIG. 3. The curtain plot 400 is shown with measured depth (MD) along the x-axis and true vertical depth (TVD) along the y-axis. The gray-scale represents the inverted formation resistivity of the formation geology surrounding the drilled well-path 404. The gray-scale ends just before the drilled well-path 404, which represents the position of a sensor 442 that acquires the variable density log data used to create the curtain plot 400. The end of the drilled well-path 404 represents the position of a drill-bit 446 and the beginning of the planned well-path 406. The curtain plot 400 further illustrates formation boundary uncertainties 410-420 and formation boundary projected uncertainties 426-436. Drilled well-path uncertainties 422-424 and planned well-path projected uncertainties 438-440 calculated according to step 306 are also illustrated in the curtain plot 400.

Above the drilled well-path uncertainty 422, which continues as the planned well-path uncertainty 438, are formation boundary uncertainties 410-414, which continue as formation boundary projected uncertainties 426-430. The formation boundary uncertainties 410-414 and formation boundary projected uncertainties 426-430 represent different probabilities P5, P95, P50, respectively, with respect to matching the actual formation boundary. Below the other drilled well-path uncertainty 424, which continues as the planned well-path uncertainty 440, are formation boundary uncertainties 416-420, which continue as formation boundary projected uncertainties 432-436. The formation boundary uncertainties 416-420 and formation boundary projected uncertainties 432-436 represent different probabilities P5, P95, P50, respectively, with respect to matching the actual formation boundary. The formation boundary uncertainty 412 and the formation boundary projected uncertainty 428 represent the best probability with respect to matching the actual formation boundary above the drilled well-path 404 and the planned well-path 406. The formation boundary uncertainty 418 and the formation boundary projected uncertainty 434 represent the best probability with respect to matching the actual formation boundary below the drilled well-path 404 and the planned well-path 406.

The method 300 may thus, be used to calculate reserve estimations and to identify untapped reserves for subsequent sidetrack, multi-lateral or horizontal development. Incorporating formation boundary uncertainties and formation boundary projected uncertainties in the curtain plot 400 is also beneficial when designing well plans and geological targets to ensure a higher probability of optimal reservoir interception. The well-path targets can also be optimized for survey uncertainty inherent in the well-plan by plotting both geological formation boundary uncertainties along with Well-path survey uncertainty due to survey sensor inaccuracies. The method 300 therefore, is intuitive and permits a direct analysis.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. Any geosteering software application may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 5, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 3-4. The memory therefore, includes a geological formation identification module, which enables steps 306 and 312 (automated) described in reference to FIG. 3. The geological formation identification module may integrate functionality from the remaining application programs illustrated in FIG. 5. In particular, any geosteering application may be used as an interface application to perform steps 302, 308-312 (manual) and 314 in FIG. 3. In addition, an inversion module may be used to calculate the uncertainties for each formation boundary, the projected uncertainties for each formation boundary, the drilled well-path, the planned well-path and the well-path target for the curtain plot created in step 302. Although a geosteering interface application and an inversion module may be used, the geological formation identification module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof

What is claimed:

1. A method for avoiding geological formation boundaries during drilling operations, comprising:
    determining formation boundaries and formation resistivity;
    determining uncertainties and projected uncertainties of the formation boundaries;
    determining uncertainties of a drilled well-path;
    determining projected uncertainties of a planned well-path;
    generating a curtain plot that includes two inverted parameters based on the formation boundaries and the formation resistivity, the uncertainties of the formation boundaries, and the uncertainties of the drilled well-path;
    generating an updated curtain plot that includes two projected inverted parameters based on updated formation boundaries and updated formation resistivity, the projected uncertainties of the updated formation boundaries, and the projected uncertainties of the planned well-path;

displaying the curtain plot with the uncertainties of the drilled well-path and the updated curtain plot with the projected uncertainties of the planned well-path;

automatically avoiding, by the drilling operations, the projected uncertainties of the formation boundaries of the curtain plot and the updated curtain plot based on the two inverted parameters and the two projected inverted parameters to maintain or adjust the planned well-path within the projected uncertainties of the planned well-path;

identifying untapped reserves based on the updated curtain plot that includes the two projected inverted parameters; and calculating reserve estimations based on the untapped reserves for subsequent sidetrack, multi-lateral, or horizontal development.

2. The method of claim 1, further comprising:

updating one of the curtain plot and the updated curtain plot, in real-time, as the drilled well-path is progressively drilled; and continuing the avoiding of the projected uncertainties of the formation boundaries until the drilled well-path reaches a final well-path target.

3. The method of claim 1, wherein the formation resistivity is variable density log data acquired from a logging tool in a high-angle, horizontal, active well.

4. The method of claim 1, wherein the uncertainties of the formation boundaries and the projected uncertainties of the updated formation boundaries represent three probabilities that match respective formation boundaries.

5. The method of claim 1, wherein the uncertainties of the formation boundaries of the drilled well-path represent a boundary for the drilled well-path and the projected uncertainties of the updated formation boundaries of the planned well-path represent a boundary for the planned well-path.

6. The method of claim 2, wherein at least one of the curtain plot and the updated curtain plot includes a well-path target and the final well-path target.

7. The method of claim 1, wherein the formation resistivity includes data projected from a vertical off-set well.

8. The method of claim 1, wherein the formation resistivity includes data projected from a resistivity inversion of a layered earth model.

9. A non-transitory program storage device tangibly carrying computer executable instructions for avoiding geological formation boundaries during drilling operations, the instructions being executable to implement:

determining formation boundaries and formation resistivity;

determining uncertainties and projected uncertainties of the formation boundaries;

determining uncertainties of a drilled well-path;

determining projected uncertainties of a planned well-path;

generating a curtain plot that includes two inverted parameters based on the formation boundaries and the formation resistivity, the uncertainties of the formation boundaries, and the uncertainties of the drilled well-path;

generating an updated curtain plot that includes two projected inverted parameters based on updated formation boundaries and updated formation resistivity, the projected uncertainties of the updated formation boundaries, and the projected uncertainties of the planned well-path;

displaying the curtain plot with the uncertainties of the drilled well-path and the updated curtain plot with the projected uncertainties of the planned well-path;

automatically avoiding, by the drilling operations, the projected uncertainties of the formation boundaries of the curtain plot and the updated curtain plot based on the two inverted parameters and the two projected inverted parameters to maintain or adjust the planned well-path within the projected uncertainties of the planned well-path;

identifying untapped reserves based on the updated curtain plot that includes the two projected inverted parameters; and calculating reserve estimations based on the untapped reserves for subsequent sidetrack, multi-lateral, or horizontal development.

10. The program storage device of claim 9, further comprising:

updating one of the curtain plot and the updated curtain plot, in real-time, as the drilled well-path is progressively drilled; and continuing the avoiding of the projected uncertainties of the formation boundaries until the drilled well-path reaches a final well-path target.

11. The program storage device of claim 9, wherein the formation resistivity is variable density log data acquired from a logging tool in a high-angle, horizontal, active well.

12. The program storage device of claim 9, wherein the uncertainties of the formation boundaries and the projected uncertainties of the updated formation boundaries represent three probabilities that match respective formation boundaries.

13. The program storage device of claim 9, wherein the uncertainties of the formation boundaries of the drilled well-path represent a boundary for the drilled well-path and the projected uncertainties of the updated formation boundaries of the planned well-path represent a boundary for the planned well-path.

14. The program storage device of claim 10, wherein at least one of the curtain plot and the updated curtain plot includes a well-path target and the final well-path target.

15. The program storage device of claim 9, wherein the formation resistivity includes data projected from a vertical off-set well.

16. The program storage device of claim 9, wherein the formation resistivity includes data projected from a resistivity inversion of a layered earth model.

17. A non-transitory program storage device tangibly carrying computer executable instructions for avoiding geological formation boundaries during drilling operations, the instructions being executable to implement:

determining formation boundaries and formation resistivity;

determining uncertainties and projected uncertainties of the formation boundaries;

determining uncertainties of a drilled well-path;

determining projected uncertainties of a planned well-path;

generating a curtain plot that includes two inverted parameters based on the formation boundaries and the formation resistivity, the uncertainties of the formation boundaries, and the uncertainties of the drilled well-path;

generating an updated curtain plot that includes two projected inverted parameters based on updated formation boundaries and updated formation resistivity, the projected uncertainties of the updated formation boundaries, and the projected uncertainties of the planned well-path;

displaying the curtain plot with the uncertainties of the drilled well-path and the updated curtain plot with the projected uncertainties of the planned well-path;

automatically avoiding, by the drilling operations, the projected uncertainties of the formation boundaries of the curtain plot and the updated curtain plot based on the two inverted parameters and the two projected inverted parameters to maintain or adjust the planned well-path;

updating one of the curtain plot and the updated curtain plot, in real-time, as the drilled well-path is progressively drilled;

continuing the avoiding of the projected uncertainties of the formation boundaries until the drilled well-path reaches a final well-path target;

identifying untapped reserves based on the updated curtain plot that includes the two projected inverted parameters; and calculating reserve estimations based on the untapped reserves for subsequent sidetrack, multi-lateral, or horizontal development.

18. The program storage device of claim 17, wherein the formation resistivity is variable density log data acquired from a logging tool in a high-angle, horizontal, active well.

19. The program storage device of claim 17, wherein the uncertainties of the formation boundaries and the projected uncertainties of the updated formation boundaries represent three probabilities that match respective formation boundaries.

20. The program storage device of claim 17, wherein the uncertainties of the formation boundaries of the drilled well-path represent a boundary for the drilled well-path and the projected uncertainties of the updated formation boundaries of the planned well-path, respectively represent a boundary for the planned well-path.

* * * * *